(12) United States Patent
Van Rotterdam (10) Patent No.: US 11,487,934 B2
(45) Date of Patent: *Nov. 1, 2022

(54) FORM TEMPLATE MATCHING TO POPULATE FORMS DISPLAYED BY CLIENT DEVICES

(71) Applicant: CITRIX SYSTEMS, INC., Fort Lauderdale, FL (US)

(72) Inventor: Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,075

(22) Filed: Apr. 21, 2021

(65) Prior Publication Data

US 2021/0240920 A1 Aug. 5, 2021

Related U.S. Application Data

(63) Continuation of application No. 16/202,294, filed on Nov. 28, 2018, now Pat. No. 10,990,751.

(51) Int. Cl.
*G06F 40/00* (2020.01)
*G06F 40/174* (2020.01)
(Continued)

(52) U.S. Cl.
CPC .......... *G06F 40/174* (2020.01); *G06F 16/953* (2019.01); *G06F 40/186* (2020.01); *G06V 30/412* (2022.01); *G06V 30/418* (2022.01)

(58) Field of Classification Search
CPC ..... G06F 40/174; G06F 40/186; G06F 16/953
See application file for complete search history.

(56) References Cited

U.S. PATENT DOCUMENTS 7,962,845 B2 6/2011 Maxwell et al.
9,176,744 B2 11/2015 Lee
(Continued)

OTHER PUBLICATIONS

Technical Support for the Active Templates Program, SoftPro Technologies, Inc., Sponsored by DARPA, AFRL-IF-RS-TR, Authors Lawrence G. Lafferty, Carl S. Lizza, 62 pages, Jun. 2005 (Year: 2005).*

(Continued)

*Primary Examiner* — Scott T Baderman
*Assistant Examiner* — Barbara M Level
(74) *Attorney, Agent, or Firm* — Allen, Dyer, Doppelt + Gilchrist, PA (57) ABSTRACT

A server includes a memory and a processor to receive from a client device a screenshot of an application page from an application. The application page includes a form requiring data to be filled in by a user of the client device. A form template is extracted from the screenshot, with the extracted form template not including form field values. The extracted form template is compared to a private form template database for a match. The private form template database includes private form templates from different applications, with each private form template having form field values previously filled in for the user. Form field values from a matched private form template are provided to the client device for the client device to populate the form in the screenshot.

20 Claims, 7 Drawing Sheets

(51) Int. Cl.
*G06F 16/953* (2019.01)
*G06F 40/186* (2020.01)
*G06V 30/412* (2022.01)
*G06V 30/418* (2022.01)

(56) References Cited

U.S. PATENT DOCUMENTS

| | | | |
|---|---|---|---|
| 9,538,345 B2 | 1/2017 | Sah et al. | |
| 9,842,097 B2 | 12/2017 | Selig | |
| 2002/0103827 A1 | 8/2002 | Sesek | |
| 2007/0168382 A1 | 7/2007 | Tillberg et al. | |
| 2014/0032267 A1 | 1/2014 | Smith et al. | |
| 2014/0122988 A1 | 5/2014 | Eigner et al. | |
| 2014/0201102 A1 | 7/2014 | Srinivasan et al. | |
| 2014/0237342 A1 | 8/2014 | King et al. | |
| 2014/0372860 A1* | 12/2014 | Craven | G06F 40/114 715/222 |
| 2015/0199541 A1 | 7/2015 | Koch et al. | |
| 2016/0253504 A1* | 9/2016 | Chen | G06F 21/6245 726/28 |
| 2019/0220508 A1* | 7/2019 | Hu | G06F 40/174 |
| 2021/0110104 A1* | 4/2021 | Leme | G06F 40/186 |

OTHER PUBLICATIONS

Personal Ontology Creation Visualization for Personal Interaction Management System, by Akrivi Katifori, Costas Vassilakis, Ilias Daradimos, George Lepouras, Yannis Ioannidis, Dept of Informatics, University of Athens, Panepistimioupolis, Ilissia 157 84, 9 pages, Apr. 2008 (Year: 2008).*

Casey et al "Machine Vision Applications Intelligent Forms Processing" Machine Vision and Applications: Jan. 1, 1992;, pp. 143-155.

Shaohua et al "An Intelligent Framework for Auto-filling Web Forms from Different Web Applications" 2013 IEEE Ninth World Congress on Services: Jun. 28, 2013; pp. 175-179.

* cited by examiner

FORM TEMPLATE MATCHING TO POPULATE FORMS DISPLAYED BY CLIENT DEVICES

RELATED APPLICATION

This application is a continuation of U.S. application Ser. No. 16/202,294 filed Nov. 28, 2018, which is hereby incorporated herein in its entirety by reference.

TECHNICAL FIELD

The present disclosure relates to client devices, and more particularly, to populating a form displayed by a client device based on a matched form template.

BACKGROUND

Browsers allow clients to access web resources. Web resources include web applications that can be accessed through a web interface. Web resources also include Software as a Service (SaaS) applications in which a third-party provider hosts applications and makes them available to customers over the Internet. Often times accessing these resources requires users to fill out forms.

Many times different forms require the same data to be filled in by the user across different applications. Within a browser accessing a single application, for example, data entries by the user may be stored to assist the user populate the same form a next time. However, it becomes challenging to collect user data and to use this data when users access different applications using different browsers.

SUMMARY

A server includes a memory and a processor to receive from a client device a screenshot of an application page from an application. The application page includes a form requiring data to be filled in by a user of the client device. A form template is extracted from the screenshot, with the extracted form template not including form field values. The extracted form template is compared to a private form template database for a match. The private form template database includes private form templates from different applications, with each private form template having form field values previously filled in for the user. Form field values from a matched private form template are provided to the client device for the client device to populate the form in the screenshot.

The server advantageously provides a match from the private form template database even if the forms corresponding to the private form templates are different from the displayed form being populated. In addition, since the private form template matching is performed at the server, the private form template matching may be performed for the user even if the user later operates a different client device.

The application providing the form may be different from the applications associated with the private form templates in the private form template database.

The application providing the form may be a web application accessed by the client device.

The processor may be further configured to extract labels and form field names from the form, correlate the labels with the form field names, and use the correlated labels and form field names to extract the form template.

The processor may be further configured to access a public form template database comprising public form templates from the different applications from different users, with each public form template including labels and form field names without form field values. The processor may be further configured to extract labels and form field names from the form, and match the label and form field names to one of the public form templates, with the matched public form template to be used as the form template extracted from the screenshot.

The extracted form template may include labels and form field names without form field values, and the private form templates from the different applications may include labels, form field names and form field values, with the form field values corresponding to the data previously filled in for the user.

The private form templates from the different applications include shared labels, and wherein the processor may be further configured to group together different form field names corresponding to each shared label. The compare for a match may include matching a label from the extracted form template to one of the shared labels, and matching the form field name for the label from the extracted form template to one of the form field names in the grouped together different form field names.

If more than one private form template matches the extracted form template, then the processor may be further configured to determine a match based on a score having been assigned to each of the more than one private form matched templates.

If more than one private form template matches the extracted form template, then the processor may be further configured to determine a match based on a context of the extracted form template.

Another aspect is directed to a method for operating a server as described above. The method includes receiving from a client device a screenshot of an application page from an application, with the application page including a form requiring data to be filled in by a user of the client device. A form template is extracted from the screenshot, with the extracted form template not including form field values. The method further includes comparing the extracted form template to a private form template database for a match. The private form template database includes private form templates from different applications, with each private form template having form field values previously filled in for the user. Form field values are provided from a matched private form template to the client device in order for the client device to populate the form in the screenshot.

Yet another aspect is directed to a method for operating a client computing device comprising displaying an application page from an application, with the application page including a form requiring data to be filled in by the user. A screenshot of the application page is generated prior to the form being filled in with the data. The screenshot of the application page is transmitted to a server that includes a private form template database comprising a plurality of private form templates from a plurality of different applications, with each private form template having different user data associated therewith previously filled in for a user. The method further includes receiving, from the server, a matched private form template based on the server comparing a form template extracted from the screenshot to the private form template database for a match. Form field values are obtained from the matched private form template, and the displayed form is populated with the form field values from the matched private form template.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
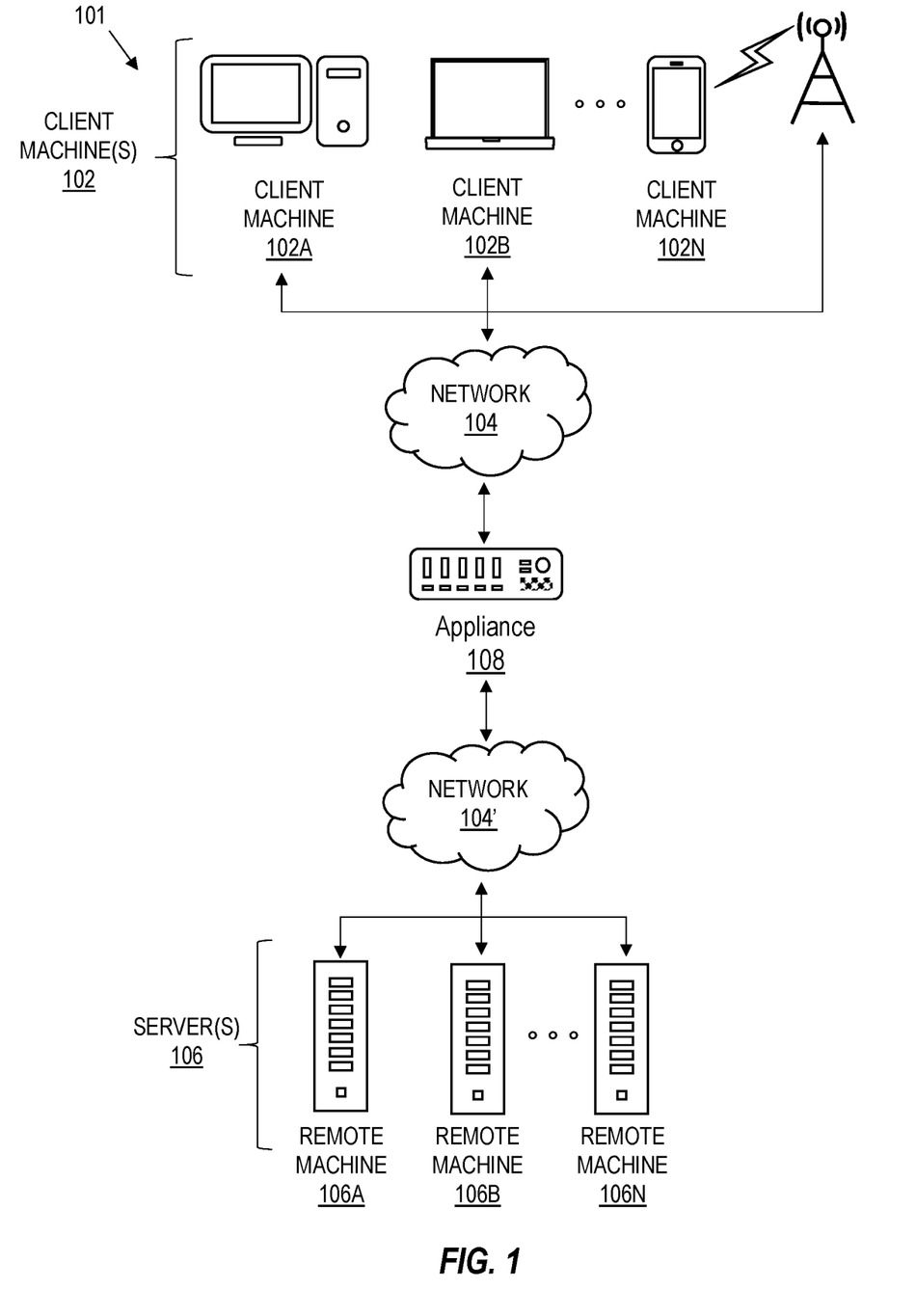
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
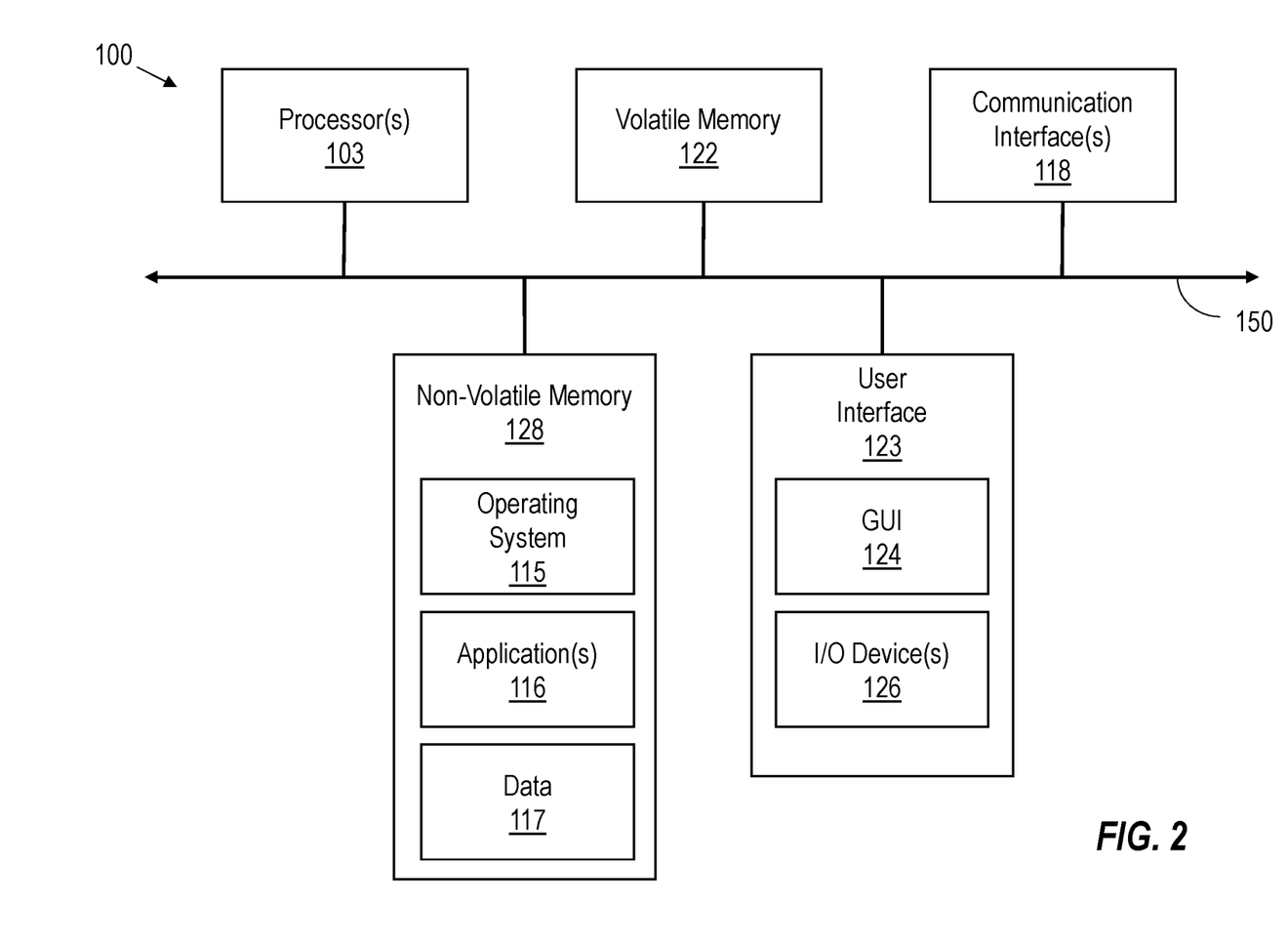
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
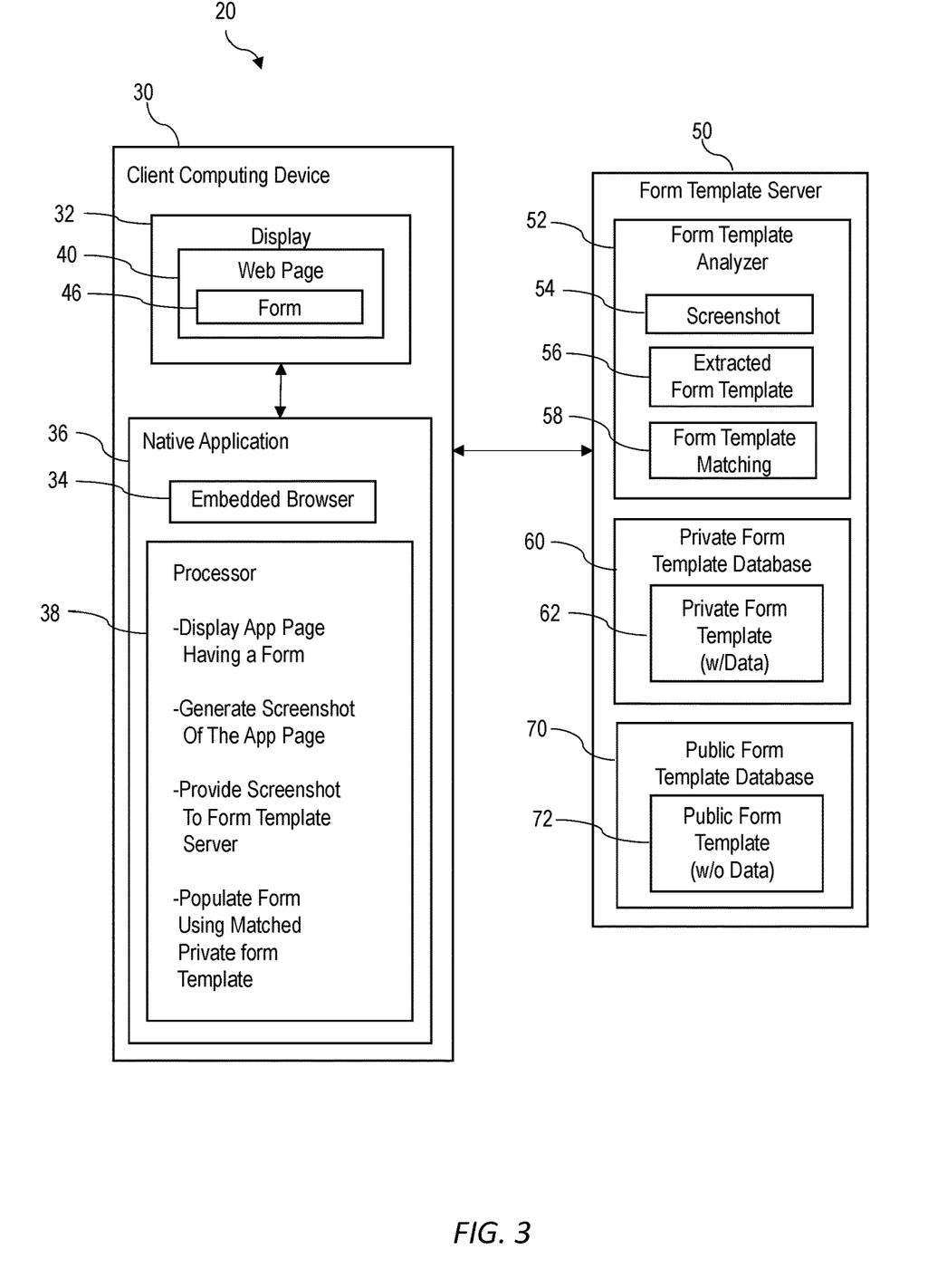
FIG. 3 is a block diagram of a computing system for populating a form displayed by a client device based on a private matched form template provided by a form template server in which various aspects of the disclosure may be implemented.

Referring initially to FIG. 3, a computing system 20 includes a client device 30 and a form template server 50. The client device 30 has a display 32 associated therewith and is configured to display an application page 40 from an application, and to generate a screenshot 54 of the application page 40. The application page 40 includes a form 46 requiring data to be filled in by a user.

The form template server 50 is configured to compare a form template 56 extracted from the screenshot 54 to a private form template database 60 for a match. The private form template database 60 includes a plurality of private form templates from a plurality of different applications, with each private form template having user data associated therewith previously filled in for the user. The client device 30 is further configured to populate the form on the display 32 with the data from the matched private form template.

The form 46 may advantageously be populated using data from other forms previously filled in by the user even if the forms are different from the displayed form 46. In addition, since the private form template matching is performed at the form template server 50, the private form template matching may be performed for the user even if the user later operates a different client device.

The client device 30 includes an embedded browser 34, and the application providing the form 46 being displayed by the client device 30 comprises a web application that is accessed via the embedded web browser 34. The web application may be a Software as a Service (SaaS) application, for example.

The embedded browser 34 is a browser embedded within a native application 36. For example, Citrix Receiver and Citrix Workspace App are programs that are installed on client devices 30.

Since the embedded browser 34 is embedded within a native application 36 within the client device 30, this allows the capability of the application to be enhanced without modifying the application. Instead, logic outside of the embedded browser 34 allows the native application 36 to control the processor 38 so as to detect the form 46 on the application page 40, and to generate a screenshot 54 of the form 46 that is then used to determine the extract form template 56.

A form template analyzer 52 is used to generate the extracted form template 56 from the screenshot 54 of the displayed form 40. The form template analyzer 52 may be within the client device 30, or alternatively, may be within the form template server 50. For discussion purposes, the form template analyzer 52 is shown within the form template server 50. Regardless of the location, the form template analyzer 52 is configured to extract labels and form field names from the form 46, correlate the labels with the form field names, and use the correlated labels and form field names to extract the form template. The form template analyzer 52 includes a text recognizer having a recognition algorithm that recognizes labels and form field names, and correlates the labels and form field names.

The form template analyzer 52 is able to match an extracted form template 56 from the current application being accessed with a private form template 62 that is from a completely different application. As an example, there is a first application having a form where user data has already been entered and a second application having a form requiring user data to be entered.

The first and second applications are different from one another, but the data to be entered for the form in the second application is the same as the data already entered for the form in the first application. The private form template database 60 includes a private form template 62 that include the data previously entered for the first application.

As an example, the data required for the form 46 is the user's address. The label may be "Street" for both of the applications but the form field name for the form in the first application is "ST1". A traditional browser stores the form field name along with the form field value filled in by the user. But when the user goes to the form in the second application, the form field name is now "ST". The traditional browser is not able to match data from the form in the first application to the form in the second application since there is not a one-to-one match in form field names.

However, with the illustrated computing system 20 the user is able to populate the form in the second application using what the user previously filled in for the form in the first application. The form template analyzer 52 advantageously works across different applications.

The form template server 50 includes a private form template database 60 and a public form template database 70. The private form template database 60 includes private form templates 62. The private form templates 62 correspond to extracted form templates that were created when the user entered data for previously accessed applications. Over time, as the user enters data into various displayed forms 46, the private form templates 62 are built up in the private form template database 60.

The private form template 62 from the private form template database 60 that matches with the extracted form template 56 is used to populate the displayed form 46. This avoids the user from having to enter the same data, such as a mailing or billing address that has already been entered by the user for a different form 46.

The public form template database 70 includes public form templates 72. The public form templates 72 include form templates without any user data. The public form templates 72 correspond to extracted form templates that were created when users other than the current user entered data for previously accessed applications.

The public form templates 72 are used to assist the form template analyzer 52 with extracting a form template 56 from the screenshot 54. As noted above, the form template analyzer 52 extracts labels and form field names, and correlates the labels with the form field names. When the form template analyzer 52 analyzes the screenshot 54, a document object model (DOM) of the screenshot 54 is analyzed. Depending on the user interface, it is not always clear which piece of the DOM is a label and a form field.

The form template analyzer 52 may have already analyzed the same screenshot even though for a different user. If so, then the corresponding extracted public form template 72 for the different user (without data) may be used by the form template analyzer 52 to identify the labels and form field names to be extracted from the current screenshot 54.

Once the labels and form field names have been extracted, then the matched public form template 72 may be used as the form template extracted from the screenshot 54. Since the public form templates 72 already have correlated labels and form field names for different applications, the form template server 52 does not have to repeat this step when the displayed form 46 already has an extracted form template as determined for a different user having already accessed the same application.

Figure 4:
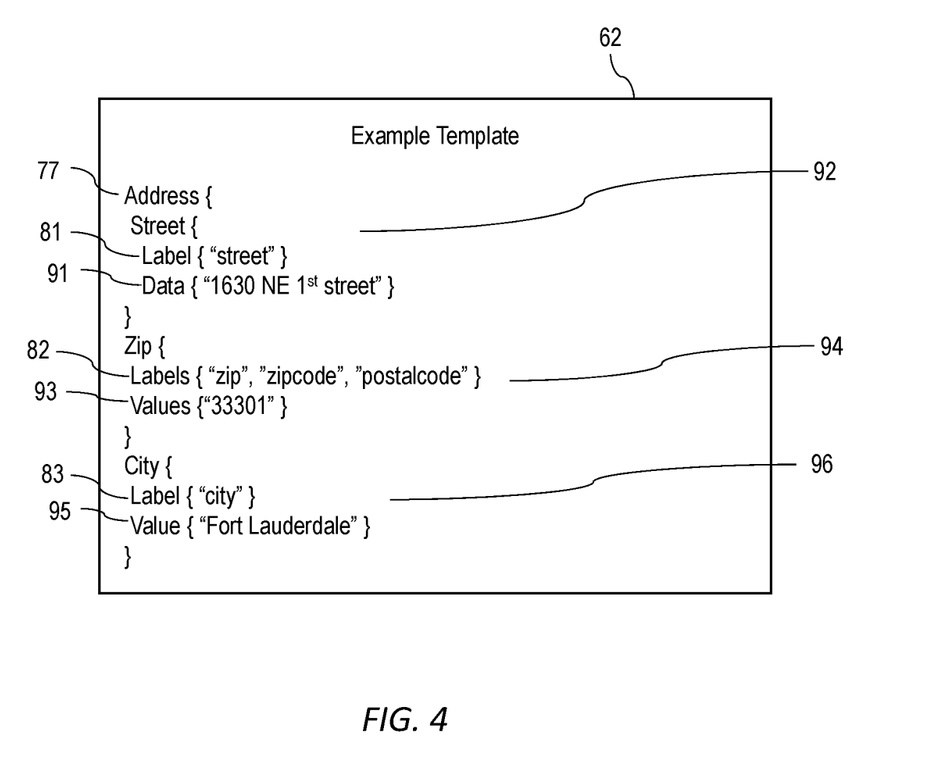
FIG. 4 is an example private form template from the private form template database illustrated in FIG. 3.

Referring now to FIG. 4, an example private form template 62 that provides a user's address data will be discussed. Each private form template include labels, form field names and form field values, with the form field values corresponding to the data previously filled in for the user. In this example, the private form template 62 includes labels 81, 82, 83; their respective form field names 91, 93, 95; and their respective form field values 92, 94, 96. The form field values 92, 94, 96 correspond to the user's address data previously filled in for the user.

In the illustrated example, label 81 corresponds to "street" and the form field value 92 associated therewith is "1630 NE $1^{st}$ street". Label 82 corresponds to multiple names including "zip", "zip code", and "postal code" and the form field value 94 associated therewith is "33301". Label 83 corresponds to "city" and the form field value 95 associated therewith is "Fort Lauderdale".

The private form templates 62 may include shared address labels 77 among the private form templates 62. The form template server 50 is further configured to logically group together the different private form templates 62 providing the same types of data. The logically grouping shows that there is a repetition of the same data form field values being entered. Instead of relying on a one-to-one mapping of the extracted form template 56 to one of the private form templates 62, the logical grouping allows the private form template 62 to be selected based on how the form field names match up.

After the form template 56 has been extracted from the screenshot 54, the form template analyzer 52 is to figure out which one of the private form templates 62 is the right template for the dialog that is to be filed in for the displayed form 46. However, the user might have multiple form field values for the private form templates 62, such as a home and work address.

One option is to show the user the both options. Another option is for the form template analyzer 52 to include a scoring algorithm to pick or suggest the right data to the user. The scoring algorithm may determine that over a majority of the time the user enters a work address into the form 46. In this case, the work address is scored higher than the home address.

Yet another option is for the form template analyzer 52 to take into account the context of the user. An example context is a location of the client device 30. If the client device 30 is at the user's place of employment, then the data for the matched private form template 62 would be selected corresponding to the work address instead of the home address. The form template analyzer 52 determines that the likelihood is higher that the user will be entering data that is more related to the office. Location of the client device 30 may be based on a GPS chip within the client device 30. If the user's office uses beacon technology, then the location of the client device may be precisely determined based on triangulation. The determined location is then passed to the form template analyzer 52.

Another content example is to look at the user's calendar, and based on the user's activities, this would have a factor on which data for a private form template 62 is to be selected. Yet another content example is to use a camera to determine facial expression's of the user. If the user's facial expression are unemotional or intense looking, then the assumption may be made the user is doing office work.

Figure 5:
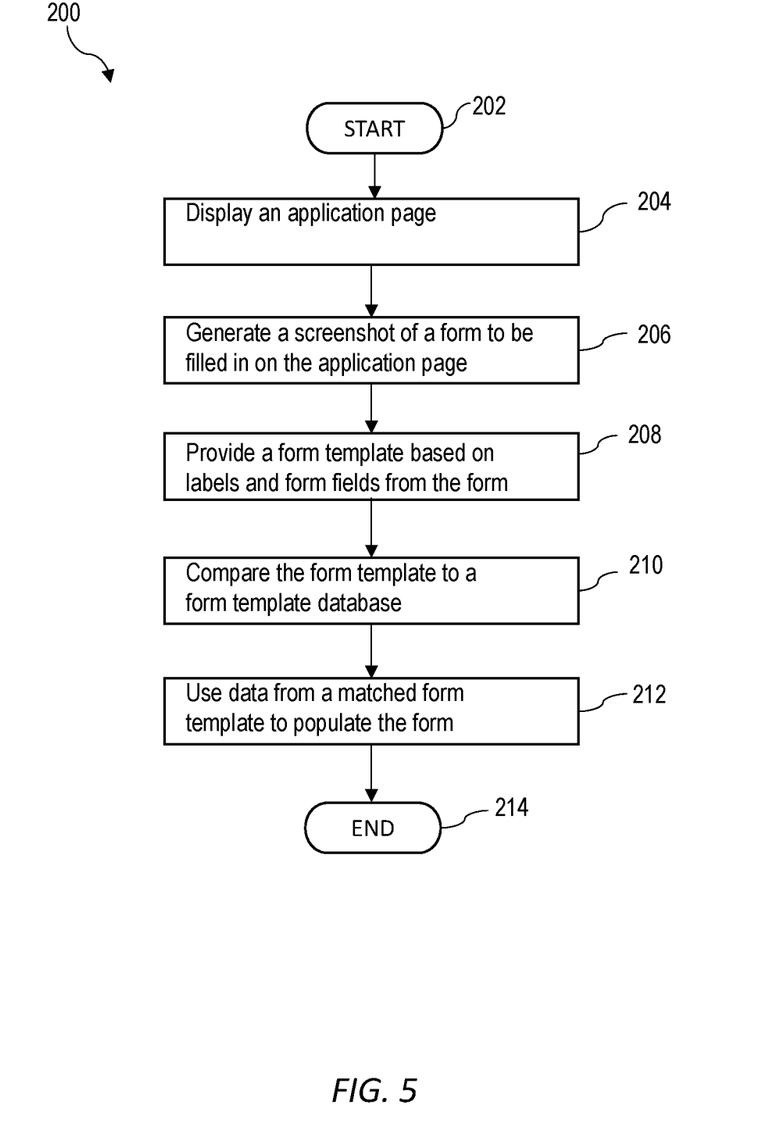
FIG. 5 is a general flowchart illustrating a method for populating a form displayed by a client device illustrated in FIG. 3.

Referring now to the flowchart 200 in FIG. 5, and generally speaking, a method for populating a form 46 displayed by a client device 30 will be discussed. From the start (Block 202), the method includes displaying an application page 40 with a form 46 to be filled in at Block 204, and generating a screenshot 54 of the from 46 at Block 206. A form template 62 is provided at Block 208 based on labels and form fields from the form 46. The form template 62 is compared to a form template database 60 at Block 210. Data from a matched form template 62 is used at Block 212 to populate the form 46. The method ends at Block 214.

Figure 6:
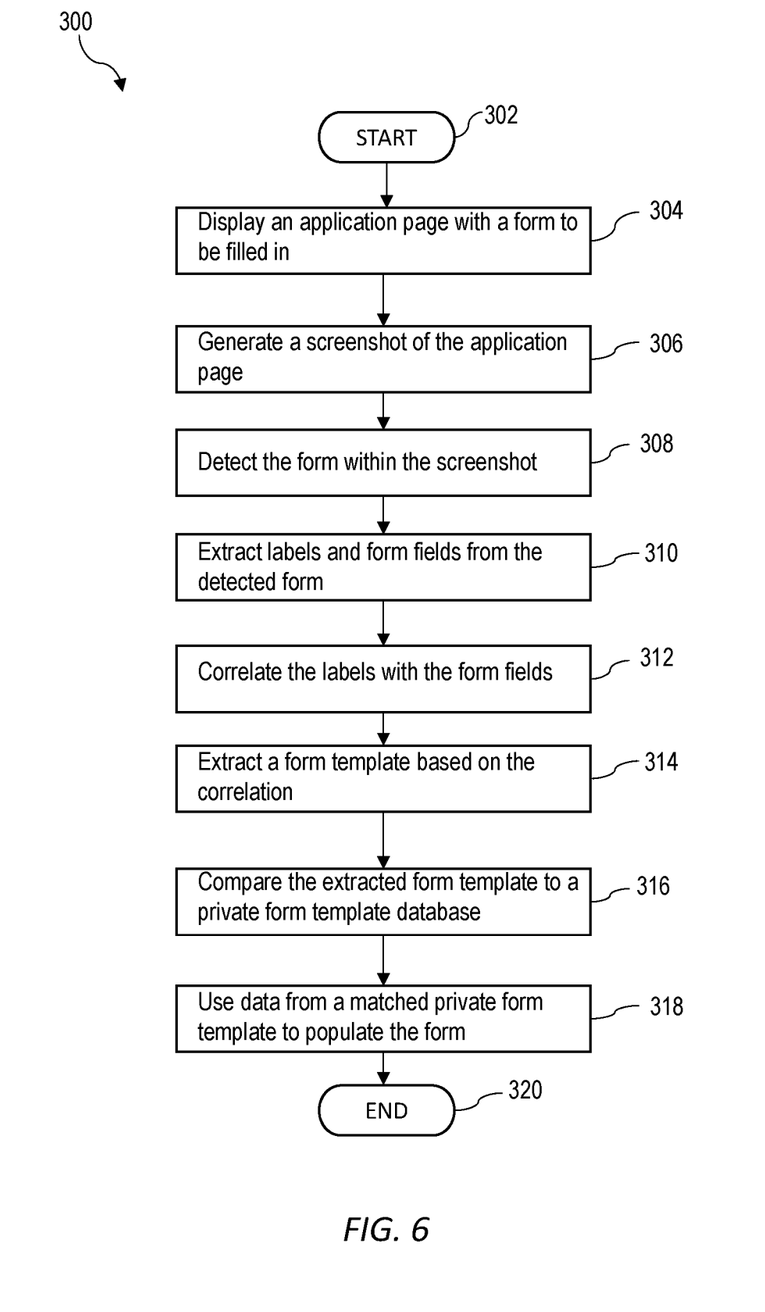
FIG. 6 is a more detailed flowchart illustrating a method for populating a form displayed by a client device illustrated in FIG. 3.

Referring now to the flowchart 300 in FIG. 6, more detailed steps for populating a form 46 displayed by a client device 30 based on a matched private form template 62 provided by the form template server 50 will be discussed. From the start (Block 302), the method includes displaying an application page 40 with a form 46 to be filled in at Block 304, generating a screenshot 54 of the application page 40 at Block 306, and detecting the form 46 within the screenshot 54 at Block 308. The labels and form fields are extracted from the detected form at Block 310. The labels are correlated with the form fields at Block 312. A form template 62 is extracted at Block 314 based on the correlation. The method further includes comparing the extracted form template 56 to a private form template database 60 at Block 316, and using data from a matched private form template 62 to populate the form 46 at Block 318. The method ends at Block 320.

Another aspect is directed to a method for operating a client computing device 30 within a computing system 20 comprising a form template server 50 that includes a private form template database 60 comprising a plurality of private form templates 62 from a plurality of different applications, with each private form template 62 having different user data associated therewith previously filled in for a user.

Figure 7:
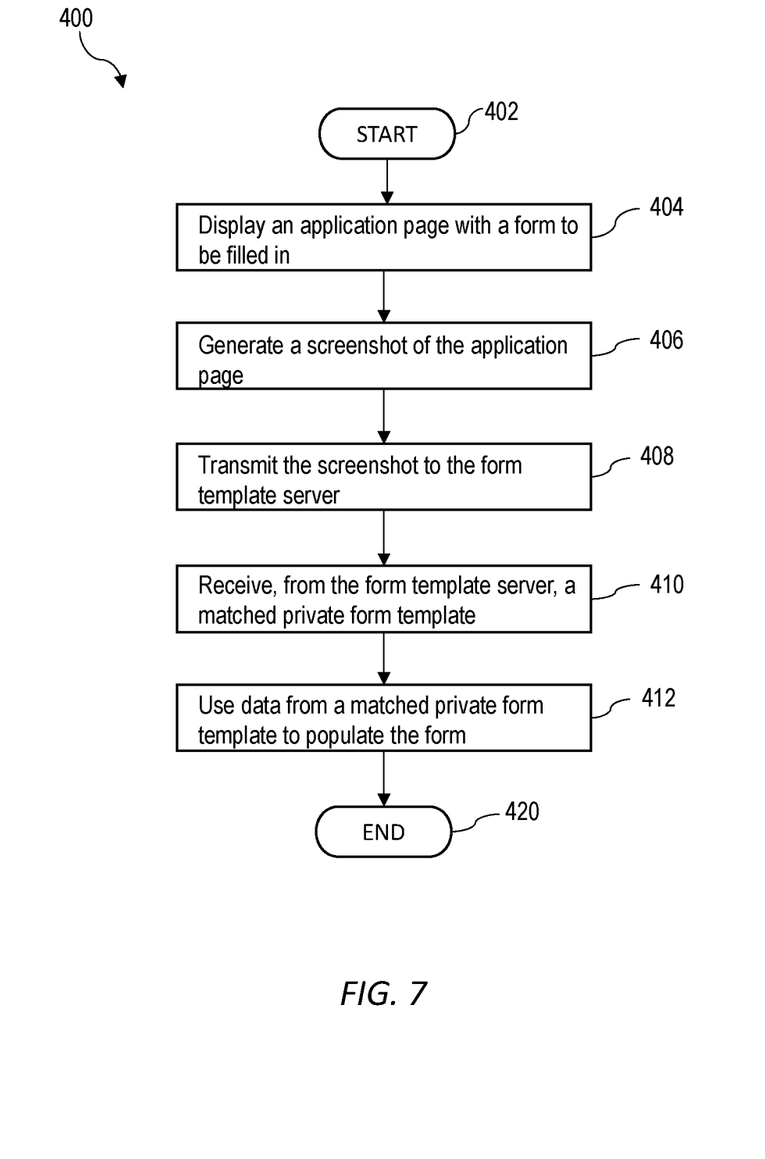
FIG. 7 is a flowchart illustrating a method for operating a client computing device within the computing system illustrated in FIG. 3.

Referring now to the flowchart 400 illustrated in FIG. 7, the method includes from the start (Block 402), displaying an application page 40 from an application at Block 404, with the application page 40 including a form 46 requiring data to be filled in by the user. A screenshot 54 of the application page 40 is generated at Block 406. The screenshot 54 of the application page 40 is transmitted to the form template server 50 at Block 408. The method further includes receiving, from the form template server 50 at Block 410, a matched private form template 72 based on the form template server 50 comparing a form template 56 extracted from the screenshot 54 to the private form template database 60 for a match. The form 46 is populated with the data from the matched private form template 72. The method ends at Bock 420.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A server comprising:
   a memory and a processor configured to perform the following:
   receive from a client device a screenshot of an application page from an application, with the application page including a form requiring data to be filled in by a user of the client device,
   extract a form template from the screenshot, with the extracted form template not including form field values,
   compare the extracted form template to a private form template database for a match, the private form template database comprising a plurality of private form templates from a plurality of different applications, with each private form template having form field values previously filled in for the user;
   in response to there being more than one private form template matching the extracted form template, determine a match using a predetermined metric associated with at least one of the matched private form templates and the extracted form template; and
   provide form field values from the matched private form template to the client device in order for the client device to populate the form in the screenshot.

2. The server according to claim 1 wherein the application providing the form is different from the applications associated with the private form templates in the private form template database.

3. The server according to claim 1 wherein the application providing the form is a web application accessed by the client device.

4. The server according to claim 1 wherein said processor is further configured to:
   extract labels and form field names from the form;
   correlate the labels with the form field names; and
   use the correlated labels and form field names to extract the form template.

5. The server according to claim 4 wherein said processor is further configured to access a public form template database comprising a plurality of public form templates from the plurality of different applications from different users, with each public form template including labels and form field names without form field values; and wherein said processor is further configured to:
   extract labels and form field names from the form; and
   match the label and form field names to one of the public form templates, with the matched public form template to be used as the form template extracted from the screenshot.

6. The server according to claim 1 wherein the extracted form template includes labels and form field names without form field values; and wherein the plurality of private form templates from the plurality of different applications include labels, form field names and form field values, with the form field values corresponding to the data previously filled in for the user.

7. The server according to claim 6 wherein the plurality of private form templates from the plurality of different applications include shared labels; and wherein said processor is further configured to group together different form field names corresponding to each shared label, with the compare for a match including the following:
- match a label from the extracted form template to one of the shared labels; and
- match the form field name for the label from the extracted form template to one of the form field names in the grouped together different form field names.

8. The server according to claim 1 wherein the predetermined metric is associated with a score having been assigned to each of the more than one private form matched templates.

9. The server according to claim 1 wherein the predetermined metric is associated with a context of the extracted form template.

10. A method for operating a server comprising:
- receiving from a client device a screenshot of an application page from an application, with the application page including a form requiring data to be filled in by a user of the client device;
- extracting a form template from the screenshot, with the extracted form template not including form field values;
- comparing the extracted form template to a private form template database for a match, the private form template database comprising a plurality of private form templates from a plurality of different applications, with each private form template having form field values previously filled in for the user;
- in response to there being more than one private form template matching the extracted form template, determine a match using a predetermined metric associated with at least one of the matched private form templates and the extracted form template; and
- providing form field values from a matched private form template to the client device in order for the client device to populate the form in the screenshot.

11. The method according to claim 10 wherein the application providing the form is different from the applications associated with the private form templates in the private form template database.

12. The method according to claim 10 wherein the application providing the form is a web application accessed by the client device.

13. The method according to claim 10 further comprising:
- extracting labels and form field names from the form;
- correlating the labels with the form field names; and
- using the correlated labels and form field names to extract the form template.

14. The method according to claim 13 further comprising:
- accessing a public form template database comprising a plurality of public form templates from the plurality of different applications from different users, with each public form template including labels and form field names without form field values;
- extracting labels and form field names from the form; and
- matching the label and form field names to one of the public form templates, with the matched public form template to be used as the form template extracted from the screenshot.

15. The method according to claim 10 wherein the extracted form template includes labels and form field names without form field values; and wherein the plurality of private form templates from the plurality of different applications include labels, form field names and form field values, with the form field values corresponding to the data previously filled in for the user.

16. The method according to claim 15 wherein the plurality of private form templates from the plurality of different applications include shared labels; and wherein the processor is further configured to group together different form field names corresponding to each shared label, with the compare for a match including the following:
- matching a label from the extracted form template to one of the shared labels; and
- matching the form field name for the label from the extracted form template to one of the form field names in the grouped together different form field names.

17. The method according to claim 16 wherein if more than one private form template matches the extracted form template, then further comprising determining a match based on a score having been assigned to each of the more than one private form matched templates.

18. The method according to claim 10 wherein if more than one private form template matches the extracted form template, then further comprising determining a match based on a context of the extracted form template.

19. A method for operating a client computing device comprising:
- displaying an application page from an application, with the application page including a form requiring data to be filled in by the user;
- generating a screenshot of the application page prior to the form being filled in with the data;
- transmitting the screenshot of the application page to a server that includes a private form template database comprising a plurality of private form templates from a plurality of different applications, with each private form template having different user data associated therewith previously filled in for a user;
- receiving, from the server, a matched private form template based on the server comparing a form template extracted from the screenshot to the private form template database for a match, and in response to there being more than one private form template matching the extracted form template, the comparing is based on a predetermined metric associated with at least one of the matched private form templates and the extracted form template; and
- obtaining form field values from the matched private form template; and
- populating the displayed form with the form field values from the matched private form template.

20. The method according to claim 19 wherein the application providing the form being displayed by the client device is different from the applications associated with the private form templates in the private form template database.

* * * * *